US008291783B2

(12) United States Patent
Shi et al.

(10) Patent No.: US 8,291,783 B2
(45) Date of Patent: Oct. 23, 2012

(54) HELICAL LOCKING MECHANISM FOR DOORS

(75) Inventors: Xiang Shi, Jiangsu (CN); Yu Gu, Jiangsu (CN); Wenping Liu, Jiangsu (CN); Guannan Xu, Jiangsu (CN); Baogang Chen, Jiangsu (CN); Bangrong Ni, Jiangsu (CN)

(73) Assignee: Nanjing Kangni Mechanical & Electrical Co., Ltd., Jiangsu (CN)

( * ) Notice: Subject to any disclaimer, the term of this patent is extended or adjusted under 35 U.S.C. 154(b) by 517 days.

(21) Appl. No.: 12/446,089

(22) PCT Filed: Mar. 5, 2007

(86) PCT No.: PCT/CN2007/000701

§ 371 (c)(1), (2), (4) Date: May 26, 2009

(87) PCT Pub. No.: WO2008/046278

PCT Pub. Date: Apr. 24, 2008

(65) Prior Publication Data

US 2010/0319259 A1 Dec. 23, 2010

(30) Foreign Application Priority Data

Oct. 18, 2006 (CN) .......................... 2006 1 0096818

(51) Int. Cl.

*F16H 3/06* (2006.01)
*F16H 27/02* (2006.01)
*F16H 29/02* (2006.01)
*F16H 29/20* (2006.01)

(52) U.S. Cl. ...................................................... 74/89.39

(58) Field of Classification Search ................. 74/89.23, 74/89.39, 424.75, 424.76, 567

See application file for complete search history.

(56) References Cited

U.S. PATENT DOCUMENTS

| | | | | |
|---|---|---|---|---|
| 2,261,450 | A * | 11/1941 | Pritchett | 81/106 |
| 2,818,743 | A * | 1/1958 | Zatsky | 74/393 |
| 3,184,214 | A * | 5/1965 | King | 251/229 |
| 4,350,460 | A * | 9/1982 | Schmelzer et al. | 404/117 |
| 4,760,907 | A * | 8/1988 | Avny | 192/141 |
| 4,914,967 | A * | 4/1990 | Proulx et al. | 74/57 |
| 5,195,390 | A * | 3/1993 | Nogaki | 74/424.75 |
| 5,337,627 | A * | 8/1994 | Nakamura | 74/424.76 |
| 5,373,754 | A * | 12/1994 | Takei | 74/424.76 |
| 5,622,078 | A * | 4/1997 | Mattson | 74/89.23 |

(Continued)

FOREIGN PATENT DOCUMENTS

CN 1224107 7/1999

(Continued)

OTHER PUBLICATIONS

Search report PCT/CN2007/000701 Jul. 26, 2007.

*Primary Examiner* — Justin Krause
(74) *Attorney, Agent, or Firm* — Young & Thompson

(57) ABSTRACT

A powerless helical locking mechanism for a door includes a screw with a variable lead angle connected with a power source, and a self-adaptive nut connected to the door. The helical slot of the screw is divided into a working segment with the helical lead angle greater than the friction angle, a closing segment with the helical lead angle smaller than the friction angle, and a transition segment between the closing and working segments. The power source actuates the screw to rotate bidirectionally.

16 Claims, 3 Drawing Sheets

U.S. PATENT DOCUMENTS

| | | | | |
|---|---|---|---|---|
| 6,009,668 | A * | 1/2000 | Reddy | 49/280 |
| 6,253,632 | B1 | 7/2001 | Poulek | |
| 6,739,092 | B2 * | 5/2004 | Heffner et al. | 49/285 |
| 7,421,922 | B2 * | 9/2008 | Hamann et al. | 74/424.76 |

FOREIGN PATENT DOCUMENTS

| | | |
|---|---|---|
| CN | 2517839 | 10/2002 |
| CN | 2523886 | 12/2002 |
| GB | 1021164 | 3/1966 |

* cited by examiner

HELICAL LOCKING MECHANISM FOR DOORS

FIELD OF THE INVENTION

The present invention is a helical locking mechanism for doors.

BACKGROUND OF THE INVENTION

Helix-driven door mechanisms are widely used. Such mechanisms are used, for example, in vehicle doors, shielding doors, and civil doors. The helix-driven door mechanisms usually have problems on locking and unlocking of the door. At present, both home and abroad, helix-driven door mechanisms usually adopt various locks formed by brakes and clutches or the locks with electromagnetic, hydraulic and pneumatic driving modes for locking and unlocking. Most door locking mechanisms mentioned above have disadvantages of complicated mechanism and low reliability, and that their unlocking usually requires additional power sources.

SUMMARY OF THE INVENTION

The present invention is aimed to solve the defects mentioned above, to put forward a simple and reliable helical locking mechanism for doors, and to realize the locking and powerless self-unlocking of helix-driven door mechanism.

The present invention provides a powerless helical locking mechanism for door, comprised of a screw with variable lead angle, and a self-adaptive nut.

The screw is connected with a power source, and the self-adaptive nut is connected with the door. The screw slot is divided into three sections: a working section with the lead angle more than the friction angle, a locking section with the lead angle less than the friction angle, and a transition section therebetween. The power source can drive the screw to rotate bidirectionally. The self-adaptive nut comprises a connected shaft sleeve and pin shaft. The self-adaptive nut is assembled with the screw to form a screw kinematic pair.

The pin shaft in the self-adaptive nut is kept deep in the screw slot and realizes linear contact with the screw slot so that the pin shaft and a screw slot form a matched screw pair to realize power and motion transfer from the power source to the self-adaptive nut.

The inventive mechanism is powerless in that both the locking and unlocking of machine does not require an additional power source.

The inventive mechanism offers high reliability in that the locking section of the screw, with a lead angle of screw pair being less than the friction angle causes self-locking and thus lets the screw with variable lead angle lockup the self-adaptive nut; that is, securely lock the door. No unlocking problems are caused by vibration, etc. While the power source drives the clockwise (CW) and counter-clockwise (CCW) rotations of the screw with variable lead angle, it also drives the self-adaptive nut and door to move synchronously in parallel with the axis of the screw, with the self-adaptive nut entering and exiting the locking section of the screw to realize the locking and powerless self-unlocking of door.

The inventive door lock mechanism has less parts and a simple structure as compared to the prior art. The present invention is suitable for various helix-driven door locks.

Working Principles of the present invention are explained below.

When the power source closes the door, the screw with variable lead angle makes the clockwise (CW) rotation and drives the self-adaptive nut to move from a working section to a locking section of the screw. Once the self-adaptive nut enters the locking section of the screw, the closing of the door is realized, and then the automatic locking of the door is realized.

When the power source opens the door, the screw with variable lead angle makes the counter-clockwise (CCW) rotation and drives the self-adaptive nut to move from the locking section to the working section of the screw. Once the self-adaptive nut withdraws from the locking section of the screw, the automatic unlocking of door is realized, and then the opening of the door is realized.

When closing the door with hands, the difference from closing the door with power source is that the self-adaptive nut may drive the screw to rotate and let the self-adaptive nut enter the locking section of the screw to realize the automatic locking of the door and fulfill the closing of the door.

When opening the door with hands, with a device to let the screw make the counter-clockwise (CCW) rotation of a specific angle, the self-adaptive nut withdraws from the locking section of the screw and unlocking is realized. Then, the opening of the door is realized by the counter-clockwise (CCW) motion of the self-adaptive nut. A shift lever, a gear, a clutch unlocking device, and many other devices may be applied for this purpose.

DETAILED DESCRIPTION OF THE EMBODIMENTS

Identification of elements illustrated in FIG. 1-6:

1—screw with variable lead angle,
2—nut,
3—retainer ring,
4—torsion spring,
5—pin shaft,
6—rolling bearing,
7—spindle sleeve,
8—bearing cap,
9—nut sleeve,
10—door,
11—power source,
12—pull-wire wheel,
13—left shift lever,
14—right shift lever,
15—right connecting plate,
16—pull-wire,
17—torsion spring,
18—middle strut,
19—self-adaptive nut,
20—screw slot The invention provides a helical locking mechanism for a door. The locking mechanism comprises a screw 1 with a variable lead angle (FIG. 2) and a self-adaptive nut 19. The screw 1 is connected with a power source 11. The power source 11 can drive the screw to rotate bi-directionally.

The self-adaptive nut 19 is connected with the door 10 so that the self-adaptive nut 19 and the door 10 move synchronously.

Figure 2:
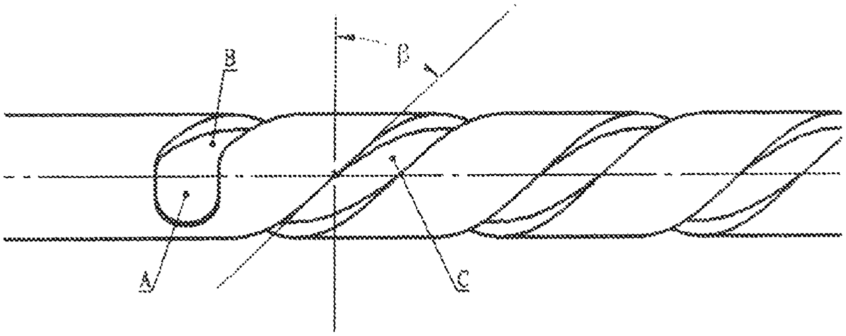
FIG. 2 is a partial enlargement view of a typical section of the screw 1.

With reference to FIG. 2, the slot 20 of the screw 1 is divided into three sections: i) a working section C with the lead angle more than the friction angle, ii) a locking section A with the lead angle less than the friction angle, and iii) a transition section B located between the working section C and the locking section A.

The screw slot 20 has rectangle or trapezoid threaded end face. The screw slot 20 may have a single head or multiple heads.

Figure 1:
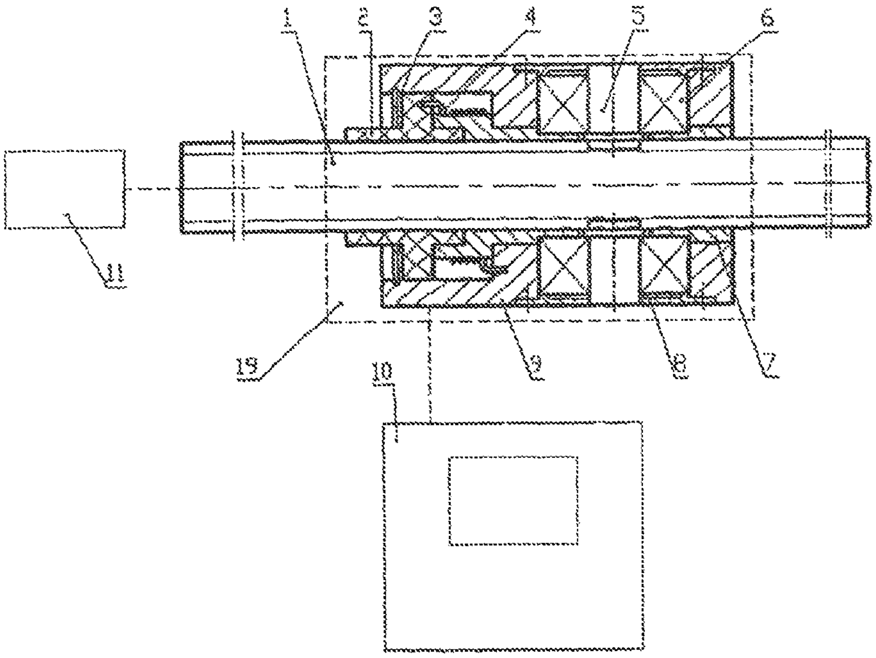
FIG. 1 is a working principle drawing of the present invention.

With reference to FIG. 1, the self-adaptive nut 19 comprises a spindle sleeve 7, a pin shaft 5, a nut sleeve 9, a nut 2, a rolling bearing 6 with a bearing cap 8, a retainer ring 3, and a torsion spring 4.

The nut 2 and the nut sleeve 9 have a circumference rotary connection, and have a rigid connection through the retainer ring 3 in an axis of the screw 1. One end of the torsion spring 4 is connected with the nut sleeve 9. The other end of the torsion spring 4 is connected with the nut 2.

The pin shaft 5 and the spindle sleeve 7 are connected in rigid connection or rotary connection. When the pin shaft 5 and the spindle sleeve 7 are in rigid connection, a screw pair in sliding friction is form. When the pin shaft 5 and the spindle sleeve 7 are in rotary connection, a screw pair is in rolling friction is formed.

When the power source 11 closes the door, the screw 1 makes a clockwise (CW) rotation to drive the self-adaptive nut 19 to move from the working section C of the screw to the locking section A of the screw, until the self-adaptive nut 19 enters the locking section A and the door is locked.

When the power source 11 opens the door, the screw 1 makes a counter-clockwise (CCW) rotation to drive the self-adaptive nut 19 to leave the locking section A and move reversely to open the door.

When manually closing the door, the movement of self-adaptive nut 19 drives the screw 1 to make the clockwise (CW) rotation. This clockwise (CW) rotation lets the self-adaptive nut 19 enter the locking section A of the screw 1 to manually close the door and lock the door.

Figure 5:
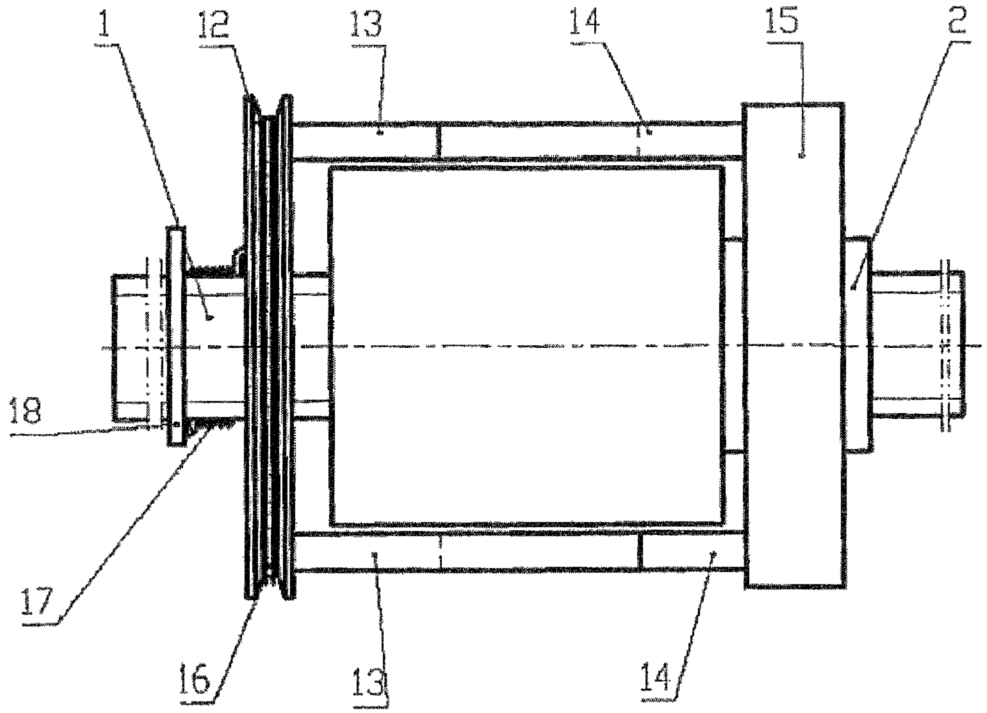
FIG. 5 is the working principle schematic diagram of a manual unlocking device.
Figure 6:
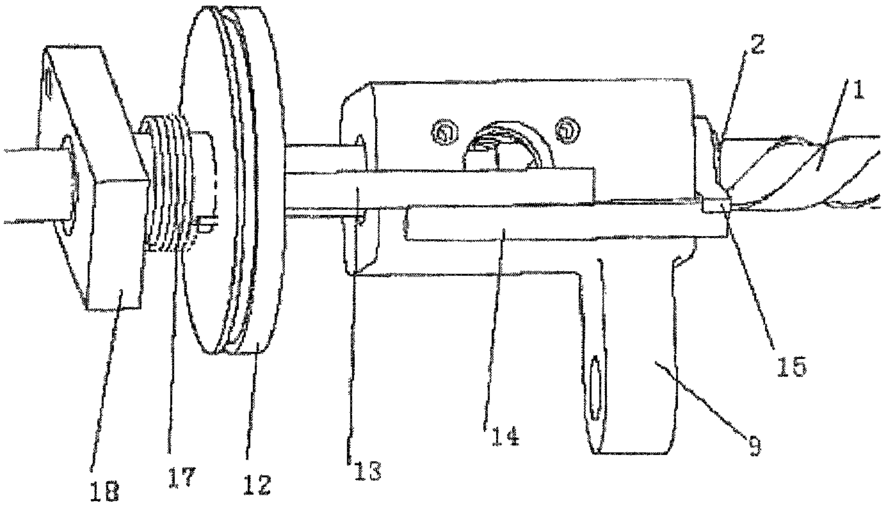
FIG. 6 is the 3D illustration of FIG. 5.

The manual opening mechanism of the door is shown in FIG. 5.

The right shift lever 14 is connected with the nut 2 of the self-adaptive nut 19 through the right connecting plate 15. The left shift lever 13 is connected with the pull wire wheel 12. The pull wire wheel 12 is idly set on the screw 1. The pull wire 16 is connected with the pull wire wheel 12. One end of the torsion spring 17 is connected with the pull wire 16. The other end of the torsion spring 17 is connected with the middle strut 18.

The pull wire 16 drives the pull wire wheel 12 and the left shift lever 13 to rotate. Through the right shift lever 14, the right connecting plate 15 drives the nut 2 to rotate to thereby realize the rotation of the screw 1 to a specific angle. After the manual unlock is completed, the door may be opened by hands with the counter-clockwise (CCW) rotation of the self-adaptive nut 19. After unlocking, under the torsion of the torsion spring 17, the pull wire wheel 12 and the pull wire 16 reset to be ready for the next manual unlocking.

FIG. 2 is a partial enlarged view of a typical section of the screw slot 20. Part A is the locking section, with the lead angle less than the friction angle. Part C is the working section, with the lead angle more than the friction angle. Part B is the transition section located between parts A and C. In part B the lead angle varies continuously.

Figure 3:
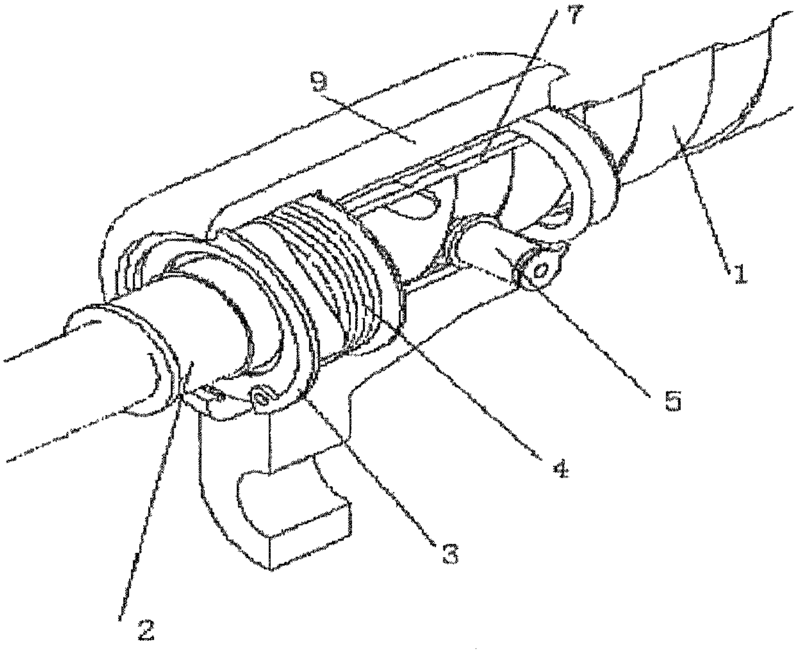
FIG. 3 is the perspective cross-sectional view of a pin shaft of a self-adaptive nut at the working section of the screw.

FIG. 3 is an illustration of the pin shaft 5 of the self-adaptive nut 19 at the working section C of the screw 1. The self-adaptive nut 19 and the screw 1 are assembled into a screw kinematic pair. The pin shaft 5 is deep in the screw slot 20 and is in linear contact with the screw slot 20. The pin shaft 5 and the screw slot 20, with any lead angles, can form the matched screw pair to transfer power and motion, to realize opening and closing of the door.

Figure 4:
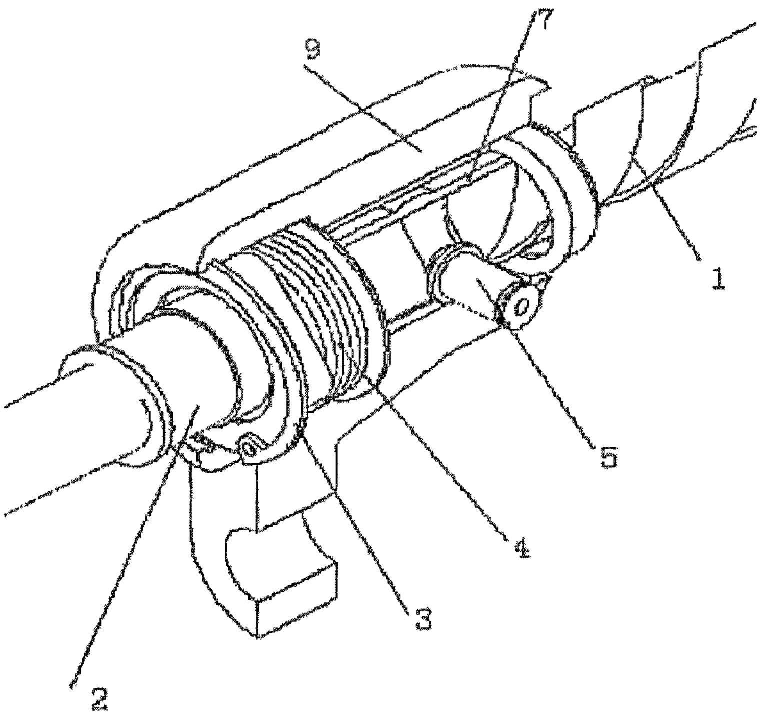
FIG. 4 is the perspective cross-sectional view of the pin shaft of the self-adaptive nut at the locking section of the screw.

FIG. 4 is an illustration of the pin shaft 5 of the self-adaptive nut 19 at the locking section A of the screw 1. The self-locking is caused by the lead angle of the screw pair being less than the friction angle. The screw slot 20 can lockup the pin shaft 5 so that the self-adaptive nut 19 is unable to move. This reliably locks the door.

The invention claimed is:

1. A helical locking mechanism for a door, comprising:

exactly one power source (11);

exactly one screw (1) having an axis and a helical slot (20), the slot (20) divided into i) a working section (C) with a lead angle more than a friction angle, ii) a locking section (A) with a lead angle less than a friction angle, and iii) a transition section (B) located between the working section (C) and the locking section (A), a lead angle of the transaction section varying; and a self-adaptive nut (19) assembled with the screw (1), wherein, in use, the self-adaptive nut (19) is connected with the door (10), the self-adaptive nut (19) comprising a spindle sleeve (7) connected to a pin shaft (5), the pin shaft (5) located in the screw slot (20) and in linear contact with the screw slot (20), the pin shaft (5) and screw slot (20) realizing a matched screw kinematic pair to transfer power and motion from the power source (11), via the bidirectionally rotation of the screw (1), to the self-adaptive nut (19), wherein the screw (1) is connected to the power source (11), the power source (11) driving the screw (1) to rotate bidirectionally, the power source (11) further driving the self-adaptive nut and the door to move synchronously in parallel with the axis of the screw, with the self-adaptive nut entering and exiting the locking section (A) to realize the locking and self-unlocking of door.

2. The helical locking mechanism of claim 1, wherein, when the power source closes the door, the screw (1) makes a clockwise (CW) rotation and drives the self-adaptive nut (19) to move from the working section (C) to the locking section (A), the self-adaptive nut entering the locking section (A) the closing the door and automatically locking of the door, when the power source opens the door, the screw (1) makes a counter-clockwise (CCW) rotation and drives the self-adaptive nut (19) to move from the locking section (A) to the working section (C), the self-adaptive nut withdrawing from the locking section (A) automatically unlocking the door and then opening the door, when closing the door manually, the self-adaptive nut (19) driving the screw (1) to rotate and have self-adaptive nut (19) enter the locking section (A) to realize the automatic locking of the door and the closing of the door, and when opening the door manually, the self-adaptive nut (19) withdrawing from the locking section (A) realizing unlocking of the door.

3. A helical locking mechanism for a door, comprising:

a screw (1) having an axis and a slot with a variable lead angle, the slot (20) divided into i) a working section (C)

with a lead angle more than a friction angle, ii) a locking section (A) with a lead angle less than a friction angle, and iii) a transition section (B) located between the working section (C) and the locking section (A), a lead angle of the transaction section varying;

a self-adaptive nut (19) connected to the door; and a power source (11), the screw (1) being connected with the power source (11) so that the power source (11) drives the screw (1) to rotate bidirectionally, the self-adaptive nut (19) comprising a spindle sleeve (7), a pin shaft (5), a nut sleeve (9), a nut (2), a rolling bearing (6) with a bearing cap (8), a retainer ring (3), and a first torsion spring (4), the nut (2) and the nut sleeve (9) having i) a circumference rotary connection and ii) a rigid connection through the retainer ring (3) in the axis of the screw (1);

a first end of the first torsion spring (4) connected with the nut sleeve (9) and an opposite, second end of the first torsion spring (4) connected with the nut (2), the pin shaft (5) connected with the spindle sleeve (7) wherein the screw (1) is connected to the power source (11), wherein the power source (11) driving the screw (1) to rotate bidirectionally, the power source (11) further drives the self-adaptive nut and the door to move synchronously in parallel with the axis of the screw, with the self-adaptive nut entering and exiting the locking section (A) to realize the locking and self-unlocking of door.

4. The helical locking mechanism of claim 3, wherein, the power source (11), in closing the door, drives the screw (1) to make a clockwise (CW) rotation to drive the self-adaptive nut (19) to move from the working section (C) to the locking section (A) until the self-adaptive nut (19) enters the locking section (A) and the door is locked, the power source (11), in opening the door, drives the screw (1) to make a counter-clockwise (CCW) rotation to drive the self-adaptive nut (19) to leave the locking section (A) and move reversely to open the door, when manually closing the door, the self-adaptive nut (19) is moved to drive the screw (1) to make the clockwise (CW) rotation, letting the self-adaptive nut (19) enter the locking section (A) to manually close the door and lock the door.

5. The helical locking mechanism of claim 4, further comprising:

a right connecting plate (15);

a right shift lever (14) connected with the nut (2) of the self-adaptive nut (19) through the right connecting plate (15);

a pull wire wheel (12) idly set on the screw (1);

a left shift lever (13) connected with the pull wire wheel (12);

a pull wire (16) connected with the pull wire wheel (12);

a middle strut (18);

a second torsion spring (17), a first end of the second torsion spring (17) connected with the pull wire (16) and an opposite, second end of the second torsion spring (17) connected with the middle strut (18), wherein, in manually unlocking and opening the door, i) the pull wire (16) drives the pull wire wheel (12) and the left shift lever (13) to rotate and, through the right shift lever (14), the right connecting plate (15) drives the nut (2) to rotate to realize rotation of the screw (1) to a specific angle to manually unlock, and ii) counter-clockwise (CCW) rotation of the self-adaptive nut (19) opens the door, and after unlocking, under torsion of the second torsion spring (17), the pull wire wheel (12) and the pull wire (16) reset to be ready for a next manual unlocking.

6. The helical locking mechanism of claim 5, wherein, with the pin shaft (5) at the working section (C), the self-adaptive nut (19) and the screw (1) form a screw kinematic pair with the pin shaft (5) in the screw slot (20) of the screw (1) and in linear contact with the screw slot (20), the pin shaft (5) and the screw slot (20) forming a matched screw pair for transferring power and motion to realize opening and closing of the door.

7. The helical locking mechanism of claim 6, wherein, with the pin shaft (5) at the locking section (A), the self-adaptive nut (19) and the screw (1) are in a self-locking position caused by the lead angle of screw pair being less than the friction angle, the screw slot (20) locking the pin shaft (5) so that the self-adaptive nut (19) is unable to move, thereby locking the door.

8. The helical locking mechanism of claim 4, wherein, with the pin shaft (5) at the working section (C), the self-adaptive nut (19) and the screw (1) form a screw kinematic pair with the pin shaft (5) in the screw slot (20) of the screw (1) and in linear contact with the screw slot (20), the pin shaft (5) and the screw slot (20) forming a matched screw pair for transferring power and motion to realize opening and closing of the door.

9. The helical locking mechanism of claim 8, wherein, with the pin shaft (5) at the locking section (A), the self-adaptive nut (19) and the screw (1) are in a self-locking position caused by the lead angle of screw pair being less than the friction angle, the screw slot (20) locking the pin shaft (5) so that the self-adaptive nut (19) is unable to move, thereby locking the door.

10. The helical locking mechanism of claim 3, wherein, when the power source closes the door, the screw (1) makes a clockwise (CW) rotation and drives the self-adaptive nut (19) to move from the working section (C) to the locking section (A), the self-adaptive nut entering the locking section (A) the closing the door and automatically locking of the door, when the power source opens the door, the screw (1) makes a counter-clockwise (CCW) rotation and drives the self-adaptive nut (19) to move from the locking section (A) to the working section (C), the self-adaptive nut withdrawing from the locking section (A) automatically unlocking the door and then opening the door, when closing the door manually, the self-adaptive nut (19) driving the screw (1) to rotate and have self-adaptive nut (19) enter the locking section (A) to realize the automatic locking of the door and the closing of the door, and when opening the door manually, the self-adaptive nut (19) withdrawing from the locking section (A) realizing unlocking of the door.

11. A helical locking mechanism for a door, comprising:

a screw (1) having an axis and a slot with a variable lead angle, the slot (20) divided into i) a working section (C) with a lead angle more than a friction angle, ii) a locking section (A) with a lead angle less than a friction angle, and iii) a transition section (B) located between the working section (C) and the locking section (A), a lead angle of the transaction section varying;

a self-adaptive nut (19) connected to the door; and a power source (11), wherein the screw (1) is connected to the power source (11), the power source (11) driving the screw (1) to rotate bidirectionally, the power source (11) further driving the self-adaptive nut and the door to move synchronously in parallel with the axis of the screw, with the self-adaptive nut entering and exiting the locking section (A) to realize the locking and self-unlocking of door.

12. The helical locking mechanism of claim 11, wherein, the power source (11), in closing the door, drives the screw (1) to make a clockwise (CW) rotation to drive the self-adaptive nut (19) to move from the working section (C) to the locking section (A) until the self-adaptive nut (19) enters the locking section (A) and the door is locked, the power source (11), in opening the door, drives the screw (1) to make a counter-clockwise (CCW) rotation to drive the self-adaptive nut (19) to leave the locking section (A) and move reversely to open the door, when manually closing the door, the self-adaptive nut (19) is moved to drive the screw (1) to make the clockwise (CW) rotation, letting the self-adaptive nut (19) enter the locking section (A) to manually close the door and lock the door.

13. The helical locking mechanism of claim 12, wherein the self-adaptive nut (19) comprises a spindle sleeve (7), a pin shaft (5), a nut sleeve (9), a nut (2), a rolling bearing (6) with a bearing cap (8), a retainer ring (3), and a first torsion spring (4), the nut (2) and the nut sleeve (9) having i) a circumference rotary connection and ii) a rigid connection through the retainer ring (3) in the axis of the screw (1);

a first end of the first torsion spring (4) connected with the nut sleeve (9) and an opposite, second end of the first torsion spring (4) connected with the nut (2), the pin shaft (5) connected with the spindle sleeve (7), and further comprising:

a right connecting plate (15);

a right shift lever (14) connected with the nut (2) of the self-adaptive nut (19) through the right connecting plate (15);

a pull wire wheel (12) idly set on the screw (1);

a left shift lever (13) connected with the pull wire wheel (12);

a pull wire (16) connected with the pull wire wheel (12);

a middle strut (18);

a second torsion spring (17), a first end of the second torsion spring (17) connected with the pull wire (16) and an opposite, second end of the second torsion spring (17) connected with the middle strut (18), wherein, in manually unlocking and opening the door, i) the pull wire (16) drives the pull wire wheel (12) and the left shift lever (13) to rotate and, through the right shift lever (14), the right connecting plate (15) drives the nut (2) to rotate to realize rotation of the screw (1) to a specific angle to manually unlock, and ii) counter-clockwise (CCW) rotation of the self-adaptive nut (19) opens the door, and after unlocking, under torsion of the second torsion spring (17), the pull wire wheel (12) and the pull wire (16) reset to be ready for a next manual unlocking.

14. The helical locking mechanism of claim 13, wherein, with the pin shaft (5) at the working section (C), the self-adaptive nut (19) and the screw (1) form a screw kinematic pair with the pin shaft (5) in the screw slot (20) of the screw (1) and in linear contact with the screw slot (20), the pin shaft (5) and the screw slot (20) forming a matched screw pair for transferring power and motion to realize opening and closing of the door.

15. The helical locking mechanism of claim 14, wherein, with the pin shaft (5) at the locking section (A), the self-adaptive nut (19) and the screw (1) are in a self-locking position caused by the lead angle of screw pair being less than the friction angle, the screw slot (20) locking the pin shaft (5) so that the self-adaptive nut (19) is unable to move, thereby locking the door.

16. The helical locking mechanism of claim 11, wherein, when the power source closes the door, the screw (1) makes a clockwise (CW) rotation and drives the self-adaptive nut (19) to move from the working section (C) to the locking section (A), the self-adaptive nut entering the locking section (A) the closing the door and automatically locking of the door, when the power source opens the door, the screw (1) makes a counter-clockwise (CCW) rotation and drives the self-adaptive nut (19) to move from the locking section (A) to the working section (C), the self-adaptive nut withdrawing from the locking section (A) automatically unlocking the door and then opening the door, when closing the door manually, the self-adaptive nut (19) driving the screw (1) to rotate and have self-adaptive nut (19) enter the locking section (A) to realize the automatic locking of the door and the closing of the door, and when opening the door manually, the self-adaptive nut (19) withdrawing from the locking section (A) realizing unlocking of the door.

* * * * *